UNITED STATES PATENT OFFICE.

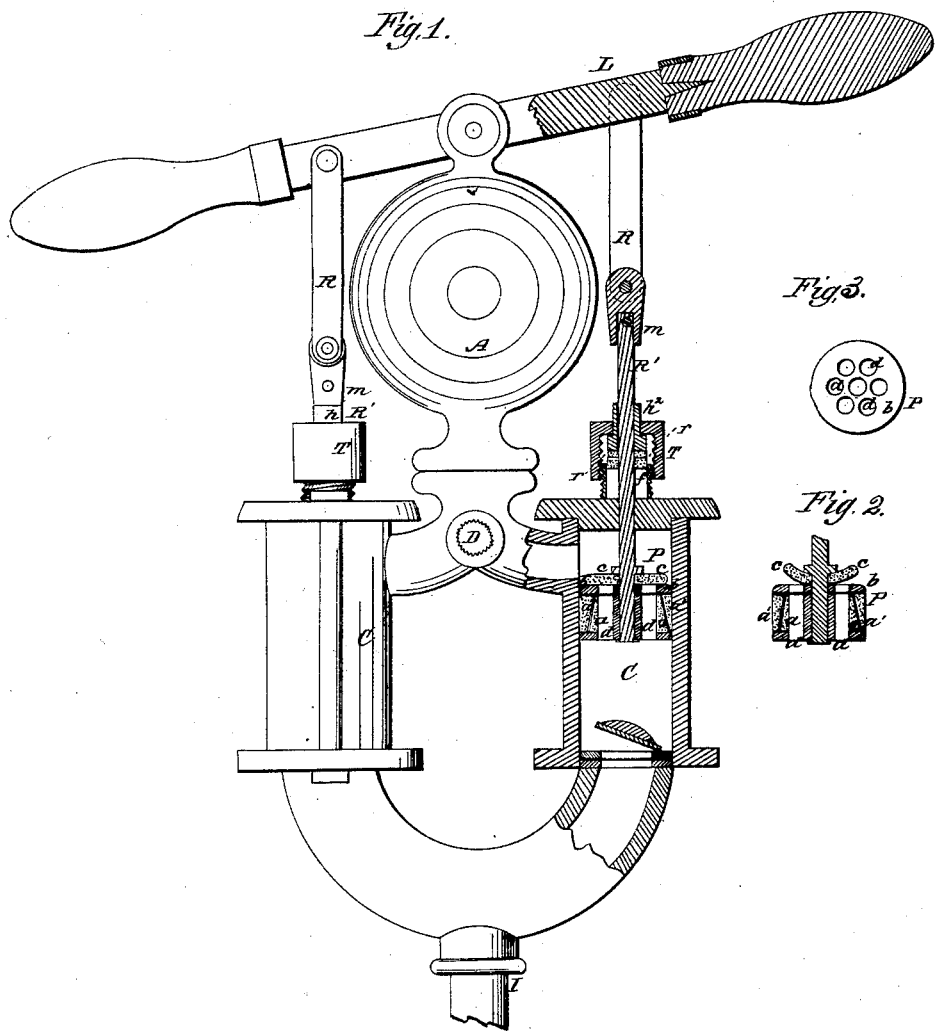

FRANCIS G. WYNKOOP, OF CORNING, NEW YORK.

PUMP.

Specification of Letters Patent No. 19,003, dated December 29, 1857.

*To all whom it may concern:*

Be it known that I, FRANCIS G. WYNKOOP, of Corning, in the county of Steuben and State of New York, have invented a new and useful Improvement in Pumps; and I do hereby declare that the following is a full, clear, and exact description of the construction and operation of the same, reference being had to the annexed drawing, forming part of this specification, in which—

Figure 1 is an elevation of the pump, showing one cylinder in section. Fig. 2 is a section of piston through axis of rod. Fig. 3 is a top view of valve plate.

Similar characters of reference denote the same part.

My invention lies in the construction of the stuffing box.

It consists in forming the packing of india-rubber between a fixed base and a loose stuffer with which the connection on the piston rod comes in contact at each stroke, the packing serving the double purpose of spring and packing.

In the drawing C C are the cylinders, A the air chamber, L the lever, R R rods connecting same with piston rods, R' R' piston rods, P piston, I ingress pipe, and D the discharge opening.

The piston P is packed by an annular piece of rubber $a'$ with an inclined inner face, resting upon the metallic incline $a$, of the piston as shown in the drawing. The bottom plate of the piston is fixed, and the top or valve plate $b$ is loose upon the rod R'. Upon the plate $b$ is the valve $c$, the central portion of the piston having perforations $d$ for the passage of water on the descent of the piston. The loose plate $b$ permits the rubber $a'$ to rise as the piston descends, and thus allow the piston to move easily. When the piston rises, the weight upon the valve plate forces ring $a'$ down and causes the packing to fit tight in the cylinder. The packing thus becomes self adjusting.

The piston rod is packed with the rubber $r$ resting on the fixed seat $f$. Above the rubber is a loose piece $h$, through which the rod R passes. The connection $m$ of R and R' comes in contact with the head of piece $h$, at each stroke of lever L. This impact is received by the rubber packing $r$, which spring reacting upon the lever L imparts an upward movement and aids the operation of the pump, the packing $r$ thus being made to perform the double function of stuffing and spring.

I claim—

The combination of seat $f$, loose piece $h$ and rubber packing $r$, as set forth.

In testimony whereof, I have hereunto signed my name before two subscribing witnesses.

FRANCIS G. WYNKOOP.

Witnesses.
  C. H. THOMSON,
  E. D. MILLS.